United States Patent
Bugas et al.

(10) Patent No.: US 8,455,068 B2
(45) Date of Patent: *Jun. 4, 2013

(54) POULTRY BOX

(75) Inventors: Pete Bugas, Salisbury, MD (US);
Lawrence C. Nykwest, Bernville, PA (US); Jim Krahn, Easton, MD (US)

(73) Assignee: Interstate Corrpack LLC, Cambridge, MD (US)

( * ) Notice: Subject to any disclaimer, the term of this patent is extended or adjusted under 35 U.S.C. 154(b) by 891 days.

This patent is subject to a terminal disclaimer.

(21) Appl. No.: 12/320,429

(22) Filed: Jan. 26, 2009

(65) Prior Publication Data

US 2010/0189961 A1    Jul. 29, 2010

(51) Int. Cl.
  *B29D 22/00*   (2006.01)
  *B32B 37/12*   (2006.01)
  *B32B 3/28*    (2006.01)
  *B65D 5/28*    (2006.01)
  *C08L 91/00*   (2006.01)

(52) U.S. Cl.
  USPC .......... 428/34.2; 428/182; 156/278; 156/280; 229/194; 524/313

(58) Field of Classification Search
  USPC .......... 428/182, 34.2; 156/278, 280; 229/194; 524/313
  See application file for complete search history.

(56) References Cited

U.S. PATENT DOCUMENTS

| 2,840,138 | A |   | 6/1958  | Johnston et al. |
| 3,691,002 | A | * | 9/1972  | Blandy .................. 428/182 |
| 4,752,637 | A |   | 6/1988  | Israel |
| 5,858,551 | A | * | 1/1999  | Salsman ................. 428/480 |
| 6,001,286 | A |   | 12/1999 | Sleeter |
| 6,066,379 | A | * | 5/2000  | Ma et al. .............. 428/53 |
| 6,103,308 | A |   | 8/2000  | Floyd et al. |
| 6,113,981 | A |   | 9/2000  | Ogilvie, Jr. et al. |
| 6,201,053 | B1|   | 3/2001  | Dieckmann et al. |
| 6,554,899 | B1|   | 4/2003  | Ogilvie, Jr. et al. |
| 6,811,824 | B2|   | 11/2004 | Hassan et al. |
| 6,846,573 | B2| * | 1/2005  | Seydel ................. 428/537.5 |

FOREIGN PATENT DOCUMENTS

WO    WO 96/00815    1/1996

* cited by examiner

*Primary Examiner* — Michael M Bernshteyn
(74) *Attorney, Agent, or Firm* — John S. Hale; Gipple & Hale

(57) ABSTRACT

A repulpable moisture resistant poultry box having a composite structure with a fluted medium, a top backing board secured to one side of the fluted medium and a bottom backing board secured to the other side of the fluted medium. The backing boards and the fluted medium are impregnated with a hydrogenated triglyceride. The backing boards each have an outer surface coated with PET to provide moisture resistance repulpable and recyclable box.

14 Claims, 2 Drawing Sheets

POULTRY BOX

RELATED APPLICATIONS

There are no related applications.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

None.

FIELD OF THE INVENTION

The present invention generally relates to moisture resistant and water proof paper products including linerboard and corrugated board. Particularly, this invention relates to moisture resistant paper boxes used primarily in the poultry industry that are waterproofed and can be repulped and recycled to be part of the feedstock for new paper products that minimizes environmental concerns.

BACKGROUND OF THE INVENTION

In the manufacture of paper and paperboard and of products made from same, petroleum derived paraffin waxes and synthetic polymers have been used for many years as moisture retardants, water repellents, oil repellents, stiffeners, strengtheners, and release agents. Besides paraffin, the material used most often in such products is polyethylene. However, other widely used polymers in the field include polymerized acrylics, vinyls, styrenes, ethylenes and copolymers or hetero-polymers of these monomers. The paper and paperboard to which these traditional materials are applied is difficult and often impossible to repulp and recycle in standard paper mill processes because the petroleum derived polymers and, particularly, the petroleum waxes are non-biodegradable in mill white waters (circulated process waters) and discharge effluents. Furthermore, the residue of the petroleum waxes that is not removed from pulp fibers during the repulping and recycling processes causes severe problems due to buildup that occurs on the screens and felts used during the process of forming and making the paper or paperboard sheet. In addition, paper and paperboard coated or impregnated with petroleum waxes resist biodegradation and composting when disposed of in landfills and other waste disposal systems. Paper and paperboard coated or impregnated with traditional synthetic polymers and hetero-polymers are also difficult and often impossible to repulp and recycle owing to their resistance to separation from the fiber in the standard repulping processes resulting in significant fiber losses in efforts to repulp and recycle them, and these are also non-biodegradable and therefore resist composting.

Water repellent packaging currently utilizes petroleum based liquid polymers or polymer film laminates (including polyethylene or similar film laminates such as polyolefin, polyester, polyvinyl alcohol, polyvinyl acetate, polystyrene, polypropylene, and the like) which are recyclable after extensive treatment, All of these laminates require the installation of specialized repulping machinery that separates the pulp fibers from the laminated films and/or is far more expensive in terms of operating costs and/or recycled pulp fiber yields. The action of separating the fiber from the film damages some fibers causing them to be selected out of the recycled pulp and presented for reuse, and the separated film waste carries some of the fibers out of the repulpate when its adherence is not interrupted by the repulping process. Likewise, coatings and impregnating products made from or based on paraffin waxes and/or similar petroleum derivatives can be repulped for recycling in specially configured repulping equipment that removes and separates the paraffin waxes; however, as in the laminated film repulping process, the more intense physical and chemical requirements of this repulping process coupled with the lost fibers that become trapped in paraffin wax wastes cause the recyclable repulped fiber levels to fall far below those of standard repulping processes. Moreover, boxes made from such products are not biodegradable and must be separated and deposited in separate landfill areas.

The poultry box industry currently uses a wax to coat the boxes (EVA—poly(ethylene vinyl acetate) which takes a significantly long period of time to compost and leaves a chemical residue from those compounds. There appears to be little or no decomposition of higher molecular weight resin and EVA fractions.

In the prior art, a number of patents have attempted to address the above noted problem. U.S. Pat. No. 6,103,308 issued Aug. 15, 2000 is directed toward a paper and paperboard coating composition using vegetable oil triglyceride as a paper coating while U.S. Pat. No. 6,201,053 issued Mar. 13, 2001 is directed toward various triglycerides mixed with catalysts for use as a waterproofing agent on paper coating.

U.S. Pat. No. 6,846,573 issued Jan. 25, 2005 discloses the use of hydrogenated triglycerides having a melting point above 50° as a coating material for the surface of paper products to improve wet strength and moisture resistance in addition to being repulpable.

The use of tallow to treat paper is also well known in the prior art. U.S. Pat. No. 2,840,138 issued Jun. 24, 1958 discloses the use of tallow fatty acids to impregnate and penetrate corrugated paper material to provide a wilt resistant material. Also, U.S. Pat. No. 4,752,637 issued Jun. 21, 1988 is directed to a method of treating fiberboard to have superior moisture resistance with various mixtures of hydroxy terminated esters such as tallow.

SUMMARY OF THE INVENTION

The present invention is directed to a backed corrugated paper box product which has the outer paper liner or backer sheet surfaces coated with biodegradable thermoplastic resin with the inner corrugated paper medium and liner sheets being impregnated with a hydrogenated triglyceride such as tallow.

Hydrogenated tallow triglycerides can be applied in the same manner as the traditional petroleum waxes and synthetic polymers and function as moisture retardants, water repellents, oil repellents, stiffeners, strengtheners, and release agents in the manufacture of paper, paperboard, packaging, molding forms, and other common applications. A particular advantage is that such hydrogenated tallow triglycerides are readily biodegradable in paper mill white waters and is compostable in landfill or other waste disposal systems. The present invention is easier to repulp and recycle without detriment to production equipment, processes, or manufactured product quality or performance.

It is an object of this invention to produce a paper product which can be repulped and recycled.

It is another object of the invention to provide a poultry box which is biodegradable.

It is still another object of the invention to provide a poultry box which has superior moisture resistance.

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
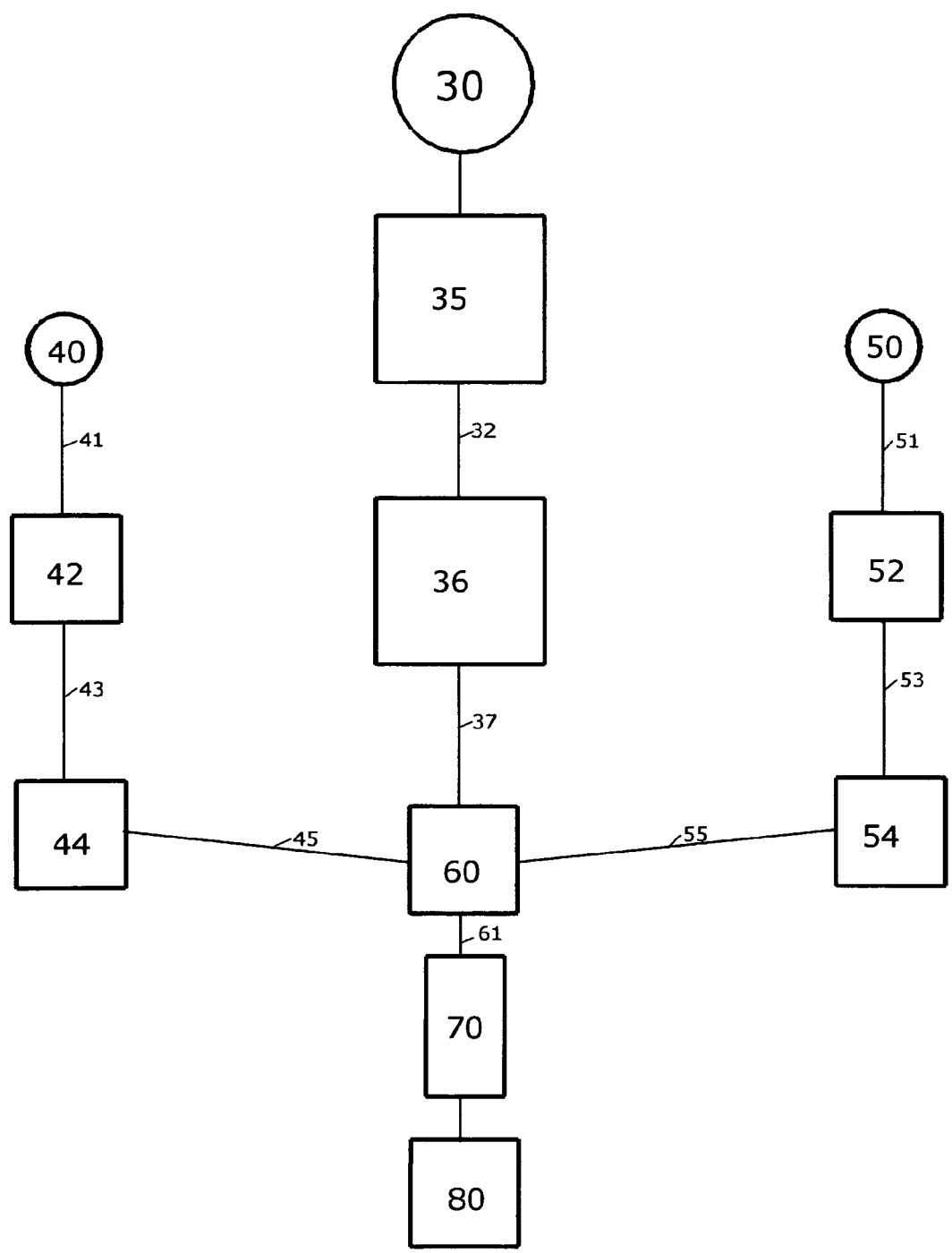
FIG. 1 is a schematic of the process used in making the poultry box composite material.
Figure 2:
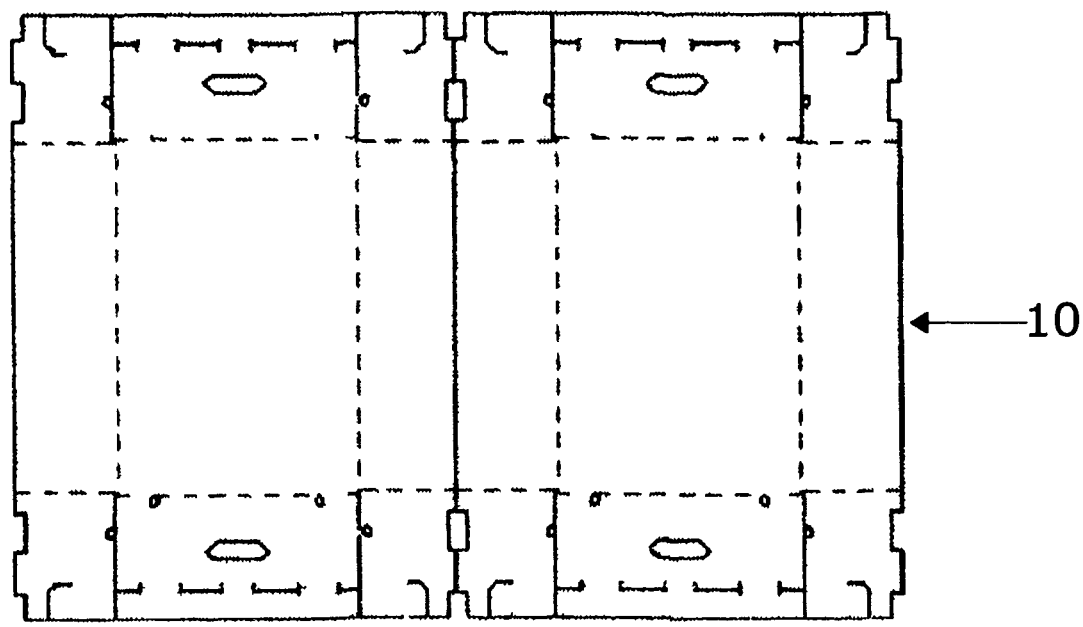
FIG. 2 is a top plan view of the inventive poultry box invention.
Figure 3:
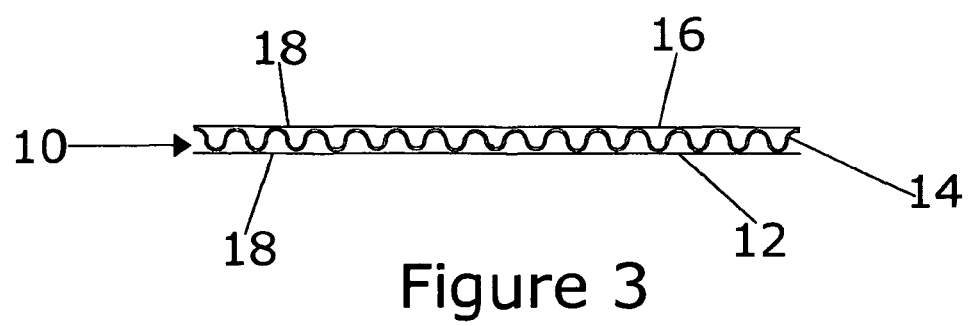
FIG. 3 is a an enlarged cross sectional view of the inventive poultry box invention.

The preferred embodiments and best mode of the invention are shown in FIGS. 1 through 3. While the invention is described in connection with certain preferred embodiments, it is not intended that the present invention be so limited. On the contrary, it is intended to cover all alternatives, modifications, and equivalent arrangements as may be included within the spirit and scope of the invention as defined by the appended claims.

Definitions

As used herein the following abbreviations and terms are understood to have the meanings as set forth:

"Triglyceride" includes both animal fats and vegetable oils and is derived from one or both of them. Animal fats include beef tallow, pork lard, poultry grease and fish oils. Vegetable oils include soybean oil, peanut oil, olive oil, palm oil, coconut oil and cottonseed oil.

"Paraffin" is a wax-like product derived from petroleum.

"Paper" includes substrates and surfaces of cellulosic material.

"PET" is a thermoplastic resin consisting of polymerized units of the monomer dimethyl terephthalate or ethylene terephthalate, with repeating $C_{10}H_8O_4$ units It has been found that hydrogenated triglycerides and preferably lard or tallow triglycerides can be substituted for petroleum based paraffin waxes and wax compounds in the manufacturer of paper products. All of these application systems involve melted triglycerides held at temperatures in the range from around 125° to 170° F. which is either squeezed, rolled, cascaded, sprayed, or doctored onto the linerboard, paper, carton stock, or corrugated medium surface to impregnate the same.

The method and machinery or equipment for repulping and recycling scrap paper in the paper and paperboard or liner board industry is both an established and well known art, and the equipment required is standard and commonly installed at most mills incorporating recycled paper in their manufacturing feed stocks. Thus, those skilled in the paper making art are also knowledgeable in re-pulping and recycling.

Poultry boxes are unique paper products that need to withstand water and poultry fluid. The present inventive poultry box is made of double backer corrugated board having a corrugated medium of 30 to 40 lb./1000 sq. ft. (MSF) paperboard of an "A", "B", "C", "E" and "F" flute size (weight depends upon various external factors). The preferred flute size used in the invention is an "A" flute having 33+/−3 flutes per lineal foot with a flute thickness of 3/8 inch or a "C" flute having 39+/−3 flutes per lineal foot with a flute thickness of 5/32 inch. A flat liner or backer board of Kraft paper (various grades) is adhered to one side of the fluted medium with a starch based adhesive and a second flat liner or backer board of Kraft paper is adhered to the other side of the fluted medium with a starch based adhesive to form a backed corrugated board. The Kraft paperboard liner may be bleached white, coated white (white coat), mottled white or colored. As is well known in the art, the medium paper is humidified by means of high pressure steam which softens the paper fibers to facilitate the formation of the flute and consequent gluing. After formation of the board, this humidity is removed by drying in the dry-end. In the present invention, the newly formed corrugated liner board is heated from the bottom by hot plates and the adhesive holding components of the structure is cured.

The present repulpable inventive degradable poultry box 10 is constructed with an inner Kraft paper liner or backer 12 impregnated with a hydrogenated triglyceride, preferably tallow at 2.5 lbs/MSF, a corrugated paper medium 14 impregnated with a hydrogenated triglyceride, preferably tallow at 3.5 lbs/MSF and the outer Kraft paper liner or backer 16 is impregnated with tallow at 2.5 lbs/MSF. Other triglycerides can be used such as animal fats and vegetable oils. Animal fats include beef tallow, pork lard, poultry grease and fish oils. Vegetable oils include soybean oil, peanut oil, olive oil, palm oil, coconut oil and cottonseed oil. Tallow used in the impregnation is commercially available from C.J. Robinson Co. and Chemol Corporation. After tallow impregnation of the paper liners, both liners 16 are coated with a coating 18 of PET at 1 to 2 lbs/MSF. Polyethylene terephthalate (commonly abbreviated PET in packaging applications), is a thermoplastic polymer resin of the polyester family. As previously noted PET consists of polymerized units of the monomer dimethyl terephthalate or ethylene terephthalate, with repeating $C_{10}H_8O_4$ units. It contains the chemical elements carbon, hydrogen, and oxygen and has a tensile strength ranging from 55-75 MPa. If fully burned, it produces only carbon dioxide ($CO_2$) and water ($H_2O$) and contains no sulphur. PET is commonly recycled, and has the number "1" as its recycling symbol.

The present poultry box 10 is constructed using standard corrugated box making machinery as is well known in the art. A roll of the medium paper 30 is positioned upstream of the corrugator. The paper is wetted and passed through a standard corrugating machine 35 and formed into a corrugated medium 32 having the desired flute size, preferably "A" or "C". The corrugated medium 32 is transported downstream through a tallow bath 36 and rollers with the corrugated medium being impregnated with tallow at 2.5 to 3.5 lbs/MSF. The impregnated corrugated medium 37 is carried by belts to an assembly station 60 where the coated liner backers 45 and 55 as further described below are secured to the corrugated medium 37 to form a composite sheet poultry box carton blank. Two liner rolls of roll stock of Kraft paper 40 and 50 are removed from the respective rolls and the respective liner sheets 41 and 51 are transported by rollers through separate tallow baths 42 and 52 and their associated rollers which applies tallow to the liner backer sheets 41 and 51 at 2.5 lbs/MSF impregnating the same. The now impregnated liner backer sheets 43 and 53 are then transported by rollers to and coated at coating stations 44 and 54 on a single sheet surface side with PET heated over 260° C. at 1-2 lbs/MSF. The PET coating can be placed on the sheet backing surface by rollers, doctor blades or spraying as is well known in the art. The coating is naturally colorless with a high transparency. The coated liner sheets 45 and 55 are then glued to the corrugated medium 37 with a suitable adhesive as is well known in the art to form a coated corrugated composite board with PET coating on its outside top and bottom surfaces. The coated corrugated composite board 61 is then passed over a heat curing bed 70 to cure and set the adhesive or glue. The heat curing bed 70 is a series of hot plates and pressure rollers which applies light pressure and heat to cure the adhesive which is standard in the corrugated box making art and the glue cures very rapidly. The composite corrugated board sheet 61 is then cut into individual blank sections in a cutting and stacking station 80 with known means stacking the individual flat sheets of composite corrugated board. The individual composite corrugated blanks are stacked and dried for a day. The blanks are later placed in a standard box cutting station which cuts and scores the composite poultry box 10 in the form shown in FIG. 2.

The poultry boxes are then delivered and assembled at the poultry packing plant and an adhesive provided by the manufacturer is placed vertically along the poultry box to provide a structurally sound moisture proof poultry box 10.

The principles, preferred embodiments and modes of operation of the present invention have been described in the foregoing specification. However, the invention should not be construed as limited to the particular embodiments which have been described above. Instead, the embodiments described here should be regarded as illustrative rather than restrictive. Variations and changes may be made by others without departing from the scope of the present invention as defined by the following claims.

What we claim is:

1. A process for making a repulpable and recyclable poultry box comprising the steps of:
   a). impregnating a corrugated paper medium with a hydrogenated triglyceride;
   b). impregnating a first paper liner board with a hydrogenated triglyceride;
   c). impregnating a second paper liner board with a hydrogenated triglyceride;
   d). coating said impregnated first paper liner board with a coating of ethylene terephthalate on one side;
   e). coating said impregnated second paper liner board with a coating of ethylene terephthalate on one side;
   f). securing said first impregnated and coated liner board and said impregnated corrugated medium and said second impregnated and coated liner board together with an adhesive to form a composite sheet; and
   g). curing said composite sheet with heat to cure said adhesive.

2. A process as claimed in claim 1 wherein said hydrogenated triglyceride is tallow.

3. A process for making a repulpable and recyclable poultry box comprising the steps of:
   a). impregnating a first liner sheet of paper from an inline corrugator with tallow;
   b). impregnating a fluted paper medium from an inline corrugator with tallow;
   c). impregnating a second liner sheet of paper from an inline corrugator with tallow;
   d). applying a biodegradable thermoplastic polyester to said impregnated first liner sheet of paper in line to coat said first liner sheet on one side;
   e). applying a biodegradable thermoplastic polyester to said impregnated second liner sheet of paper in line to coat said first liner sheet on one side;
   f). securing said first liner sheet, said medium and said second liner sheet together with an adhesive to from a composite corrugated structure with the first and second liner sheets polymer coating forming the outside surfaces of the composite corrugated structure; and
   g). curing said composite corrugated structure with heat to cure said adhesive.

4. A process as claimed in claim 3 wherein said tallow liner sheets are impregnated with tallow at about 2.5 lbs./MSF.

5. A process as claimed in claim 3 wherein said fluted medium is impregnated with tallow at about 3.5 lbs./MSF.

6. A process as claimed in claim 3 wherein said biodegradable thermoplastic polyester coating is applied to said paper liner sheets at about 1 to about 2 lbs./MSF.

7. A process as claimed in claim 3 wherein said corrugated paper medium is impregnated with tallow at a greater weight than the tallow is applied to impregnate the liner boards.

8. A process as claimed in claim 3 wherein said tallow is a beef tallow.

9. A process as claimed in claim 3 wherein said polyester coating imparts improved moisture resistance.

10. A process as claimed in claim 1 wherein said hydrogenated triglyceride is a plurality of hydrogenated triglycerides.

11. A process as claimed in claim 3 wherein first and second liner sheets are Kraft paperboard liner.

12. A process as claimed in claim 1 wherein said adhesive is a starch based adhesive.

13. A process as claimed in claim 3 further including the additional step of placing said composite corrugated structure in a cutting station which cuts and scores the corrugated structure into a box blank.

14. A process as claimed in claim 1 further including the additional step:
   h). placing said composite corrugated structure in a cutting station which cuts and scores the corrugated structure into a box blank.

* * * * *

UNITED STATES PATENT AND TRADEMARK OFFICE
Certificate

Patent No. 8,455,068 B2                          Patented: June 4, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Pete Bugas, Salisbury, MD (US); Lawrence C. Nykwest, Bernville, PA (US); and Scott Stoltzmann, Federalsburg, MD (US).

Signed and Sealed this Twenty-fifth Day of November 2014.

DAVID WU
*Supervisory Patent Examiner*
Art Unit 1762
Technology Center 1700